(12) United States Patent
Piyevsky et al.

(10) Patent No.: US 7,242,826 B2
(45) Date of Patent: Jul. 10, 2007

(54) OPTICAL FIBER LATERAL SCANNER FOR A MINIATURE OPTICAL FIBER PROBE

(75) Inventors: Sergey M. Piyevsky, Orange Village, OH (US); Felix I. Feldchtein, Cleveland, OH (US); Grigory V. Gelikonov, Nizhny Novgorod (RU)

(73) Assignee: Imalux Corporation, Cleveland, OH (US)

( * ) Notice: Subject to any disclaimer, the term of this patent is extended or adjusted under 35 U.S.C. 154(b) by 97 days.

(21) Appl. No.: 11/152,934

(22) Filed: Jun. 15, 2005

(65) Prior Publication Data

US 2006/0285791 A1    Dec. 21, 2006

(51) Int. Cl.
*G02B 6/26* (2006.01)
(52) U.S. Cl. .......................................... 385/16; 385/25
(58) Field of Classification Search ...................... None
See application file for complete search history.

(56) References Cited

U.S. PATENT DOCUMENTS

| | | | |
|---|---|---|---|
| 3,470,320 A | | 9/1969 | Pike et al. |
| 3,941,927 A | * | 3/1976 | Russell ........................ 359/196 |
| 4,236,784 A | | 12/1980 | Palmer |
| 5,727,098 A | * | 3/1998 | Jacobson ..................... 385/31 |
| 5,866,894 A | | 2/1999 | Bard et al. |
| 6,445,939 B1 | | 9/2002 | Swanson et al. |
| 6,608,684 B1 | | 8/2003 | Gelikonov et al. |

FOREIGN PATENT DOCUMENTS

| | | | |
|---|---|---|---|
| JP | 9-149878 A | * | 6/1997 |
| JP | 2000-249940 A | * | 9/2000 |

* cited by examiner

*Primary Examiner*—Rodney Bovernick
*Assistant Examiner*—Mike Stahl
(74) *Attorney, Agent, or Firm*—Tucker Ellis & West LLP

(57) ABSTRACT

The present invention relates to an optical fiber magnetic scanning arrangement for a miniature optical fiber probe and can be applied for optical beam delivery in various optical imaging techniques. The arrangement is of the type where an optical fiber is rigidly fixed to a current conductor and serving as a flexible cantilever with a capability for the distal part of the optical fiber of being deflected in a direction substantially orthogonal to its own axis. New designs of the magnetic system are less critical to the shape and dimensional tolerances of scanner elements and assembly. These designs provide a potential for a less difficult assembly process and for further miniaturization. According to one aspect of the invention the permanent magnet system includes at least a first permanent magnet with a magnetization direction that is substantially aligned with the own axis of the optical fiber. The current conductor loop is placed adjacent to the one of the end faces of the first permanent magnet. According to another aspect of the invention the permanent magnet system includes at least a first permanent magnet piece with a magnetization direction that is substantially orthogonal to the own axis of the optical fiber. The permanent magnet piece extends in a direction substantially aligned with the own axis of the optical fiber and has an inner surface, the current conductor loop being adjacent to at least a part of the inner surface of the first permanent magnet piece. According to another aspect of the invention the permanent magnet system includes a permanent magnet of a hollow cylinder type with a substantially radial magnetization direction. The permanent magnet cylinder extends in a direction substantially aligned with the own axis of the optical fiber. The current conductor loop is placed inside the permanent magnet cylinder. A miniature optical fiber probe, which incorporates the optical fiber lateral scanner of the invention, will inherit all its benefits.

8 Claims, 8 Drawing Sheets

OPTICAL FIBER LATERAL SCANNER FOR A MINIATURE OPTICAL FIBER PROBE

TECHNICAL FIELD

The present invention relates to the field of optical imaging and more specifically to an optical fiber magnetic scanning arrangement for a miniature optical fiber probe and can be applied for optical beam delivery in various optical imaging techniques, such as optical coherence tomography (OCT).

BACKGROUND ART

Prior art optical fiber lateral scanners of the type are known to comprise a stationary part, including a bearing support and an electromagnet, and a moving part including a permanent magnet attached to an optical fiber (see, e.g., U.S. Pat. No. 3,470,320; U.S. Pat. No. 5,317,148). In these devices, the optical fiber is anchored at one end to a bearing support and serves as a flexible cantilever, whereas the free end of the optical fiber is arranged such, that it can move in the direction perpendicular to its own axis. The permanent magnet is placed in a gap between the poles of the electromagnet.

A prior art optical fiber lateral scanner according to U.S. Pat. No. 4,236,784 also comprises a stationary part, which includes a bearing support and an electromagnet, and a moving part, including a permanent magnet. In this device, the permanent magnet is made as a thin film of magnetic material coated onto the optical fiber, whereas the electromagnet is arranged as an array of thin-film conductors on a substrate layer that is placed orthogonal relative to the end face of the optical fiber.

Another optical fiber lateral scanner comprising a stationary part and a moving part is known from U.S. Pat. No. 3,941,927. The stationary part comprises a bearing support and a permanent magnet, whereas the moving part includes a current conductor arranged as a conductive coating on the optical fiber. The optical fiber is placed in a gap between the pole pieces of the permanent magnet and fixedly attached to the bearing support, so that its free end can move in the direction approximately perpendicular to its own axis, and serves as a flexible cantilever. The current conductor is connected with a source of control current.

A disadvantage of above described optical fiber lateral scanners is that they do not allow for performance data necessary to be incorporated in a miniature optical fiber probe used in an OCT apparatus, in particular, miniature size, combined with required deflection of the optical fiber.

U.S. Pat. No. 6,608,684 (RU Pat. No. 2,148,378) describes an optical fiber lateral scanner, which is part of a miniature optical fiber probe. The design of the optical fiber lateral scanner is optimized for obtaining maximum deflection of the optical fiber with limited scanner size. This scanner comprises a stationary part and a moving part. The stationary part includes a bearing support and a magnetic system, said magnetic system comprising a first permanent magnet. The moving part includes a movable current conductor and an optical fiber rigidly fastened to the current conductor. The optical fiber serves as a flexible cantilever and is fixedly attached to the bearing support with a capability for a distal part of said optical fiber of being deflected in a direction substantially perpendicular to its own axis. The current conductor is made as at least one loop, which envelopes the first permanent magnet in the area of one of its poles. In a particular embodiment the first permanent magnet is provided with a groove extending in a direction substantially parallel to the axis of the optical fiber, the optical fiber being placed into said groove. In another embodiment the magnetic system additionally comprises a second permanent magnet, with one pole facing the analogous pole of the first permanent magnet, which is enveloped by the current conductor. In a different embodiment the permanent magnets are aligned at their analogous poles, whereas the optical fiber is placed into a through-hole extending therethrough in a direction substantially parallel to the axis of the optical fiber, the through-hole being formed by the facing grooves made in the analogous poles of the permanent magnets.

However, limitation common to both the optical fiber lateral scanner and the miniature optical fiber probe referred to in U.S. Pat. No. 6,608,684 regards the complexity for manufacturing due to the fact that the design is very critical to the shape and dimensional tolerances of scanner elements and assembly. In particular, placing the coil around the magnet inside the probe body is very difficult and some critical bonding places are extremely hard to access.

OBJECTS OF THE INVENTION

Accordingly, there is a need for an optical fiber lateral scanner to be used in a miniature optical fiber probe that is less critical to the to the shape and dimensional tolerances of scanner elements and easier to assemble. It is another object of the present invention to provide a potential for further miniaturization of the optical fiber lateral scanner and probe keeping a given scanning range.

SUMMARY OF THE INVENTION

With the aforesaid background in mind, an improved optical fiber lateral scanner for a miniature optical fiber probe has been developed with a potential for advanced manufacturing and assembling process along with performance parameters that are similar or better than those of optical fiber lateral scanners known from prior art.

An optical fiber lateral scanner for a miniature optical fiber probe according to one aspect of the present invention comprises a moving part and a stationary part. The moving part includes a movable current conductor and an optical fiber, the optical fiber being rigidly fixed to the current conductor. The optical fiber has a proximal part and a distal part and serves as a flexible cantilever with a capability for the distal part of the optical fiber of being deflected in a direction substantially orthogonal to its own axis. The stationary part comprises a bearing support with the proximal part of the optical fiber being fixedly attached to it, and a permanent magnet system. The permanent magnet system has a path for an optical radiation to pass from the proximal part of the optical fiber lateral scanner to the distal part of the optical fiber lateral scanner. The permanent magnet system includes a first permanent magnet with a magnetization direction that is substantially aligned with the own axis of the optical fiber. The first permanent magnet has a proximal end face and a distal end face. The current conductor is placed in the magnetic field of the permanent magnet system and includes at least one current conductor loop, the plane of the current conductor loop being substantially aligned with the own axis of the optical fiber.

In one embodiment of the present invention the current conductor loop includes a first part and a second part. The first part of the current conductor loop is adjacent to one of the end faces of the first permanent magnet. The second part of the current conductor loop is substantially opposite the first part of the current conductor loop with respect to the center of the current conductor loop.

The first permanent magnet may be provided with a through-hole, the through-hole being substantially axially aligned with the optical fiber. At least a part of the optical fiber may be placed in the through-hole within the first permanent magnet.

In another embodiment of the optical fiber lateral scanner the permanent magnet system further includes a second permanent magnet with a magnetization direction that is substantially opposite to the magnetization direction of the first permanent magnet. The second permanent magnet has a proximal end face and a distal end face. One of the end faces of the second permanent magnet is positioned adjacent to the second part of the current conductor loop. In this embodiment the first permanent magnet and the second permanent magnet may be provided with a through-hole, the through-hole being substantially axially aligned with the optical fiber. At least a part of the optical fiber may be extending along the through-hole in the first permanent magnet and along the through-hole in the second permanent magnet.

In another embodiment the permanent magnet system of the optical fiber lateral scanner further includes a soft-magnetic conductor. The soft-magnetic conductor is positioned in the magnetic field of the permanent magnet system in the location area of the current conductor loop. In this case the permanent magnet system may include either one or two permanent magnets. The soft-magnetic conductor comprises at least one soft-magnetic member.

According to another aspect of the present invention the optical fiber lateral scanner comprises a moving part and a stationary part. The moving part includes a movable current conductor and an optical fiber, the optical fiber being rigidly fixed to the current conductor. The optical fiber has a proximal part and a distal part and serves as a flexible cantilever with a capability for the distal part of the optical fiber of being deflected in a direction substantially orthogonal to its own axis. The stationary part comprises a bearing support with the proximal part of the optical fiber being fixedly attached to it, and a permanent magnet system. The permanent magnet system has a path for an optical radiation to pass from the proximal part of the optical fiber lateral scanner to the distal part of the optical fiber lateral scanner. The permanent magnet system includes a first permanent magnet piece with a magnetization direction that is substantially orthogonal to the own axis of the optical fiber. The first permanent magnet piece has an inner surface and extends in a direction substantially aligned with the own axis of the optical fiber. The current conductor is placed in the magnetic field of the permanent magnet system and includes at least one current conductor loop, the plane of the current conductor loop being substantially aligned with the own axis of the optical fiber. The current conductor loop includes a first part and a second part, the first part of the current conductor loop being adjacent to at least a part of the inner surface of the first permanent magnet piece. The second part of the current conductor loop is substantially opposite the first part of the current conductor loop with respect to the center of the current conductor loop. The inner surface of the first permanent magnet piece may be made flat.

In another embodiment the permanent magnet system further includes a second permanent magnet piece with a magnetization direction that is substantially opposite to the magnetization direction of the first permanent magnet piece. The second permanent magnet piece has an inner surface and extends in a direction substantially aligned with the own axis of the optical fiber. The second part of the current conductor loop is adjacent to at least a part of the inner surface of the second permanent magnet piece. In this embodiment the inner surface of both the first and the second permanent magnet piece may be made flat.

In another embodiment the first permanent magnet piece is made as a first permanent magnet arc with the ends of the first permanent magnet arc facing the own axis of the optical fiber. The second permanent magnet piece is made as a second permanent magnet arc with the ends of the second permanent magnet arc facing the own axis of the optical fiber. The respective ends of the first permanent magnet arc and the second permanent magnet arc are joined together forming thereby a first junction area and a second junction area. The first junction area has an inner surface, the first part of the current conductor loop being adjacent to at least to a part of the inner surface of the first junction area. The second junction area has an inner surface too, the second part of the current conductor loop being adjacent to at least to a part of the inner surface of the second junction area. In this embodiment the inner surface of both the first junction area and the second junction area may be made flat.

According to another aspect of the present invention the optical fiber lateral scanner for a miniature optical fiber probe comprises a moving part and a stationary part. The moving part includes a movable current conductor and an optical fiber, the optical fiber being rigidly fixed to the current conductor. The optical fiber has a proximal part and a distal part and serves as a flexible cantilever with a capability for the distal part of the optical fiber of being deflected in a direction substantially orthogonal to its own axis. The stationary part comprises a bearing support with the proximal part of the optical fiber being fixedly attached to it, and a permanent magnet system. The permanent magnet system has a path for an optical radiation to pass from the proximal part of the optical fiber lateral scanner to the distal part of the optical fiber lateral scanner. The permanent magnet system includes a permanent magnet of a hollow cylinder type with a substantially radial magnetization direction. The permanent magnet cylinder has an inner surface and extends in a direction substantially aligned with the own axis of the optical fiber. The current conductor is placed in the magnetic field of the permanent magnet cylinder and includes at least one current conductor loop, the plane of the current conductor loop being substantially aligned with the own axis of the optical fiber. The current conductor loop includes a first part and a second part, the first part of the current conductor loop being adjacent to a first part of the inner surface of the permanent magnet cylinder. The second part of the current conductor loop is substantially opposite the first part of the current conductor loop with respect to the center of the current conductor loop and adjacent to a second part of the inner surface of the permanent magnet cylinder.

In the present invention the new designs of the electromagnetic system are less critical to the shape and dimensional tolerances of the assembly and its elements. These designs provide a potential for a less difficult assembly process and for further miniaturization. A miniature optical fiber probe, which incorporates the optical fiber lateral scanner of the invention, will inherit all its benefits.

These and other objects and advantages of the invention will become more fully apparent from the following description, the appended claims and the accompanying drawings.

BRIEF DESCRIPTION OF DRAWINGS

For a more complete understanding of the present invention and the advantages thereof, reference is now made to the following description taken in conjunction with the accompanying drawings, in which.

DETAILED DESCRIPTION OF THE INVENTION

Figure 1:
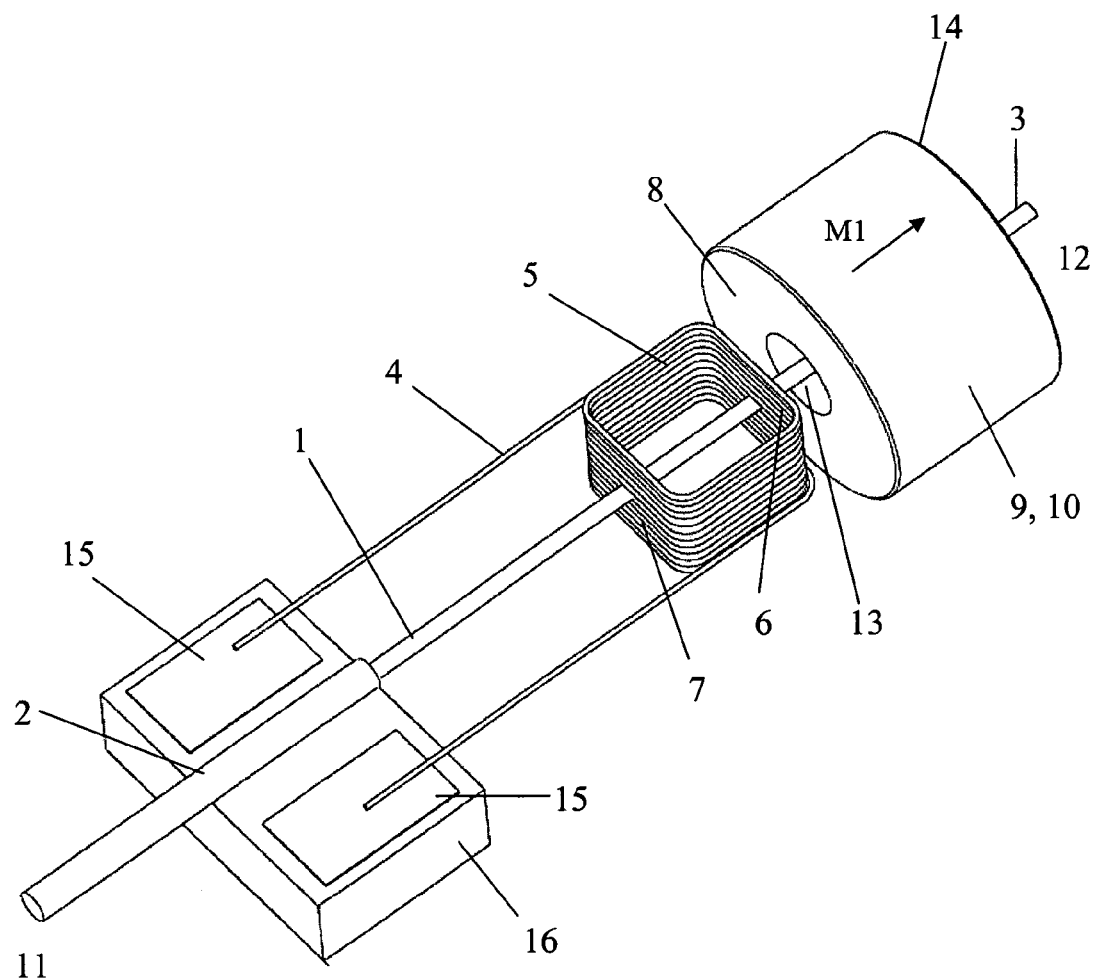
FIG. 1 shows a general view of one embodiment of the optical fiber lateral scanner with the permanent magnet system comprising one permanent magnet with a magnetization direction that is substantially aligned with the own axis of the optical fiber.

Referring to operation of the optical fiber lateral scanner illustrated in FIG. 1, an optical radiation from a source of optical radiation, which is not shown in the drawing, passes along an optical fiber 1 from its proximal part 2 to its distal part 3. The optical fiber 1 is single-mode and is an element of a movable part of the optical fiber lateral scanner. Another element of the movable part is a current conductor 4, which is rigidly fixed to the optical fiber 1 and can be made from insulated copper wire. The current conductor 4 includes at least one loop 5. The plane of the current conductor loop 5 is substantially aligned with the own axis (not shown in the drawing) of the optical fiber 1. The current conductor loop 5 includes a first part 6 and a second part 7. In the embodiment of FIG. 1 the first part 6 of the current conductor loop 5 is adjacent to a proximal end face 8 of a first permanent magnet 9 of a permanent magnet system 10. The second part 7 of the current conductor loop 5 is substantially opposite the first part 6 of the current conductor loop 5 with respect to the center of the current conductor loop 5.

The permanent magnet system 10 is an element of a stationary part of the optical fiber lateral scanner. The first permanent magnet 9 is made from a hard ferromagnetic magnetic material, i.e. NdFeB. A magnetization direction M1 of the first permanent magnet 9 is substantially aligned with the own axis of the optical fiber 1. It is evident that the magnetization direction M1 may be opposite to that shown in the drawing. The permanent magnet system 10 is designed having a path for the optical radiation to pass from the proximal part 11 of the optical fiber lateral scanner to its distal part 12. In the embodiment of FIG. 1 the first permanent magnet 9 is provided with a through-hole 13, which is substantially axially aligned with the optical fiber 1. A part of the optical fiber 1 is placed in the through-hole 13. The diameter of the through-hole 13 in the first permanent magnet 9 at its distal end face 14 may be larger than the diameter of the through-hole 13 at its proximal end face 8 (not shown in the drawing). The diameter of the through-hole 13 at the distal end face 14 of the first permanent magnet 9 is dependent on the predetermined deflection amplitude of the distal part 3 of the optical fiber 1. The first permanent magnet 9 may be positioned beyond the distal part 3 of the optical fiber 1 (not shown in the drawing). In the embodiment of FIG. 1 the distal part 3 of the optical fiber 1 extends beyond the first permanent magnet 9.

The first permanent magnet 9 creates a stationary magnetic field. The magnetic field lines of this stationary magnetic field (not shown in the drawing) cross the first part 6 of the current conductor loop 5 in a direction substantially orthogonal to the current direction in the first part 6 of the current conductor loop 5. The current conductor 4 is connected with a source of control current (not shown in the drawing). The connection can be provided via electrodes 15, which may be fixed on a bearing support 16. The bearing support 16 is another element of the stationary part of the optical fiber scanner. So, when control current is applied a force occurs that affects the current conductor loop 5 in a direction substantially orthogonal to the plane of the current conductor loop 5. This force being proportional to the current strength in the current conductor 4 and to the intensity of the stationary magnetic field created by the first permanent magnet 9 causes respective displacement of the current conductor loop 5, to which the optical fiber 1 is fixed. The proximal part 2 of the optical fiber 1 is fastened to the bearing support 16, the optical fiber 1 serving as a flexible cantilever. Thus, the impact of this force leads to a deflection of the distal part 3 of the optical fiber 1 in a direction substantially orthogonal to its own axis.

Figure 2:
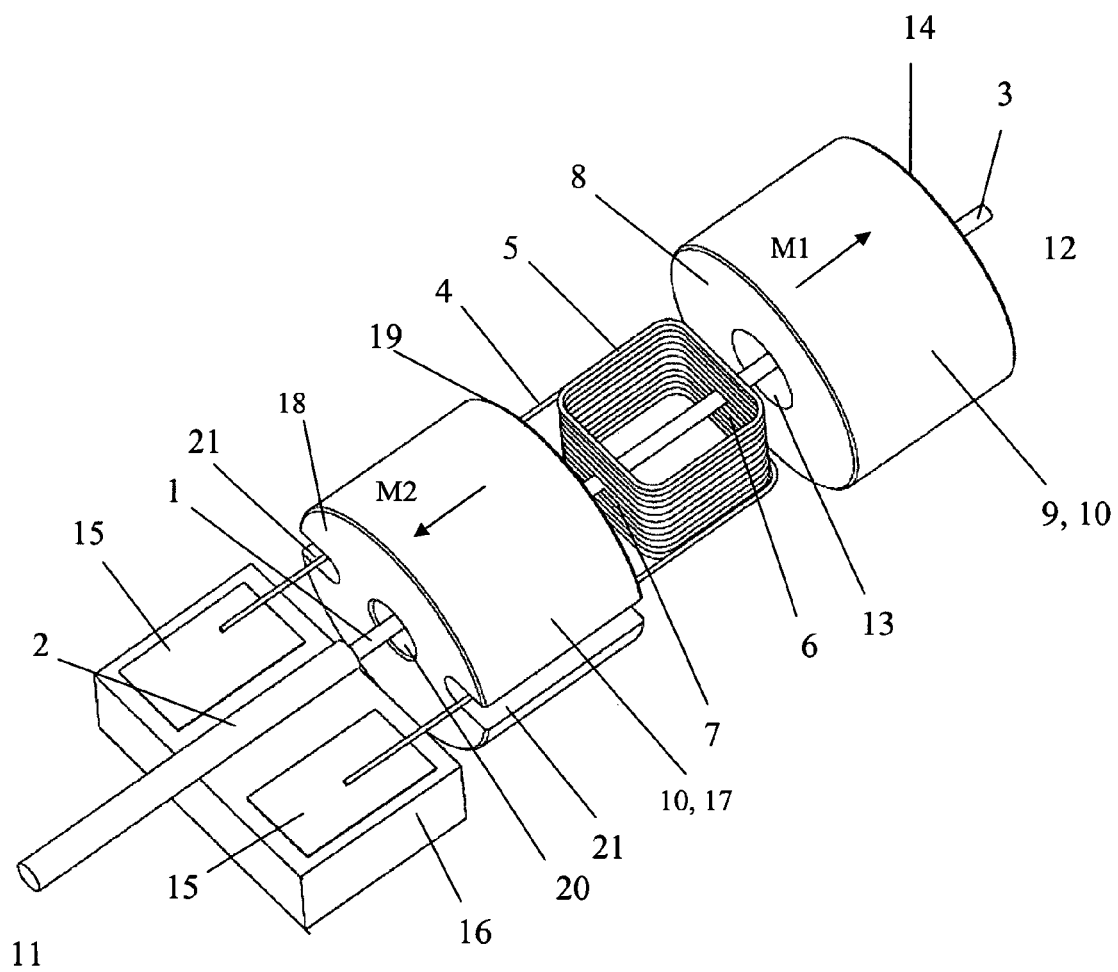
FIG. 2 shows a general view of another embodiment of the optical fiber lateral scanner with the permanent magnet system comprising two permanent magnets with magnetization directions that are substantially aligned with the own axis of the optical fiber and opposite to each other.

Another embodiment of the optical fiber lateral scanner is shown in FIG. 2. This embodiment operates analogous to that shown in FIG. 1. In this embodiment the permanent magnet system 10 further includes a second permanent magnet 17 with a magnetization direction M2 that is substantially opposite to the magnetization direction M1 of the first permanent magnet 9. The second permanent magnet 17 has a proximal end face 18 and a distal end face 19. In the embodiment of FIG. 2 the distal end face 19 of the second permanent magnet 17 is positioned adjacent to the second part 7 of the current conductor loop 5. The second permanent magnet 17 is made from a hard ferromagnetic magnetic material, analogous to that of the first permanent magnet 9. In the embodiment of FIG. 2 the first permanent magnet 9 is positioned in the distal part 12 of the optical fiber lateral scanner and is provided with a through-hole 13, which is substantially axially aligned with the optical fiber 1. The second permanent magnet 17 is provided with a through-hole 20, which is also substantially axially aligned with the optical fiber 1. The optical fiber 1 extends along the through-hole 13 and along the through-hole 20. In this particular embodiment the second permanent magnet 17 is provided with grooves 21, the proximal parts of the current conductor 4 extending along grooves 21. The stationary magnetic field is created by the first permanent magnet 9 and the second permanent magnet 17. The magnetic lines of force of this stationary magnetic field cross the first part 6 and the second part 7 of the current conductor loop 5 in a direction substantially orthogonal to the current direction in the current conductor loop 5. The current direction in the first part 6 of the current conductor loop 5 is opposite to that of the second part 7. As mentioned above the magnetization direction M2 of the second permanent magnet 17 is substantially opposite to the magnetization direction M1 of the first permanent magnet 9. Thus, when control current is applied the force that affects the current conductor loop 5 has the same direction both in the first part 6 and in the second part 7. This force causes respective displacement of the current conductor loop 5 which leads to a deflection of the distal part 3 of the optical fiber 1 in a direction substantially orthogonal to its own axis. Since the forces that cause displacement of the current conductor loop 5 are summarized the deflection amplitude in this embodiment is larger than in the embodiment of FIG. 1.

Figure 3:
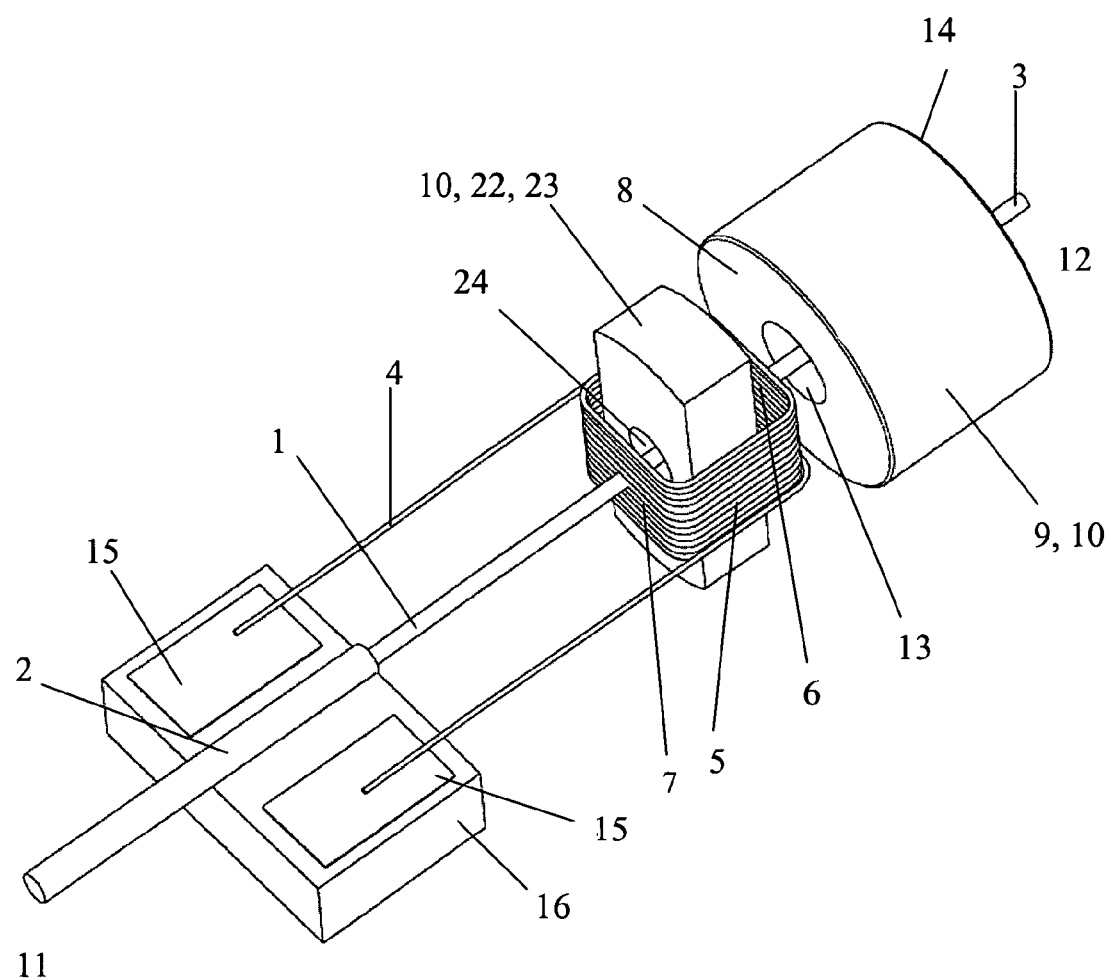
FIG. 3 shows a general view of another embodiment of the optical fiber lateral scanner with the permanent magnet system including a soft-magnetic conductor.
Figure 4:
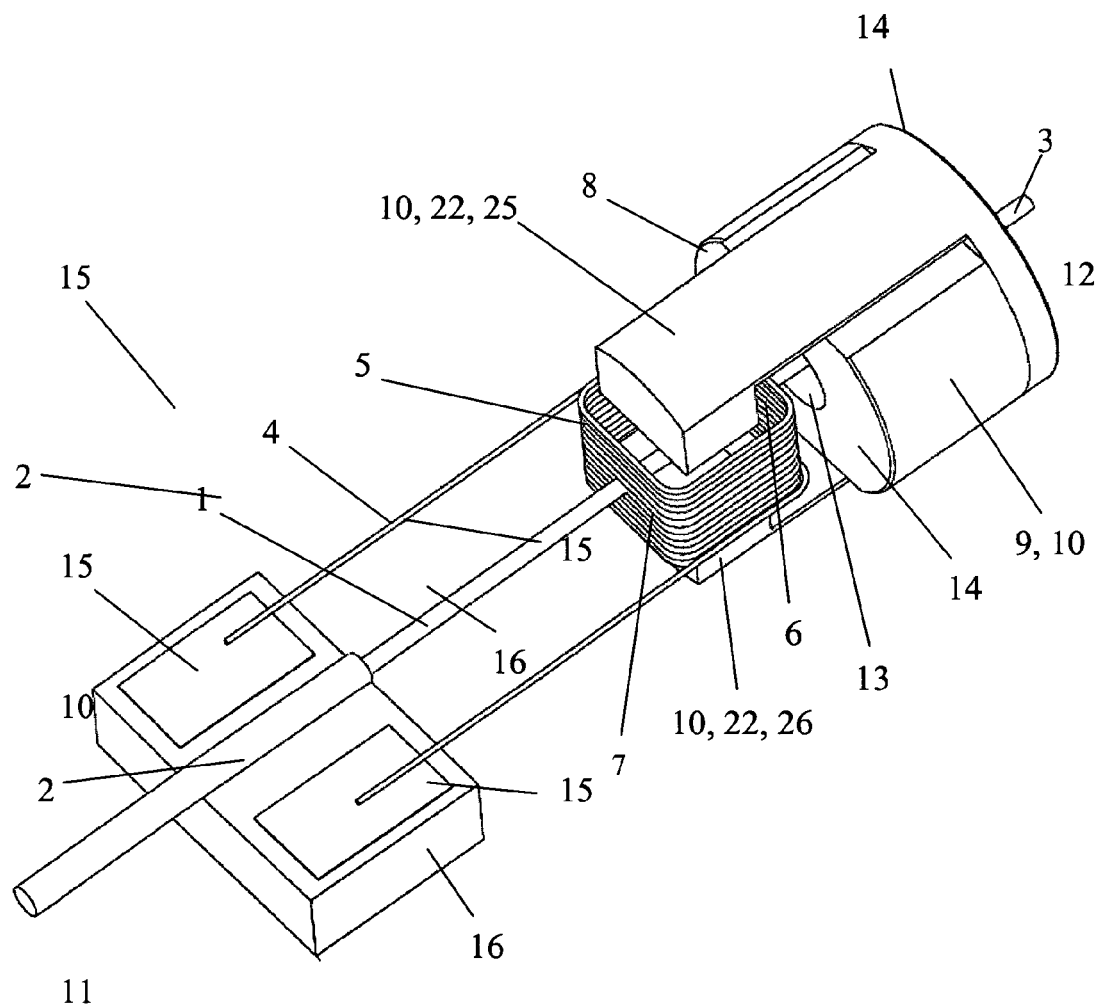
FIG. 4 shows a general view of another embodiment of the optical fiber lateral scanner with the permanent magnet system including a soft-magnetic conductor, which extends from a permanent magnet and is rigidly fixed to it.

In the embodiments shown in FIG. 3 and in FIG. 4 the permanent magnet system 10 of the optical fiber lateral scanner further includes a soft-magnetic conductor 22. The soft-magnetic conductor 22 is positioned in the magnetic field of the permanent magnet system 10 in the location area of the current conductor loop 5. The soft-magnetic conductor 22 comprises at least one soft-magnetic member. In the embodiment of FIG. 3 the permanent magnet system 10 includes one permanent magnet 9. The soft-magnetic conductor 22 comprises one soft-magnetic member 23, which is provided with a through-hole 24. The through-hole 24 is substantially axially aligned with the optical fiber 1. In this embodiment the distal part 3 of the optical fiber 1 extends through the through-hole 24 in the member 23. The current conductor loop 5 envelopes the soft-magnetic member 23. In the embodiment of FIG. 4 the permanent magnet system 10 includes one permanent magnet 9. The soft-magnetic conductor 22 comprises a soft-magnetic member 25 and a soft-magnetic member 26, which extend toward each other from opposite parts of the permanent magnet 9 and are rigidly fixed to it. In this embodiment the current conductor loop 5 envelopes partially the soft-magnetic member 25 and the soft-magnetic member 26. In the embodiments shown in FIG. 3 and in FIG. 4 the soft-magnetic conductor 22 may be made from soft iron.

Figure 5:
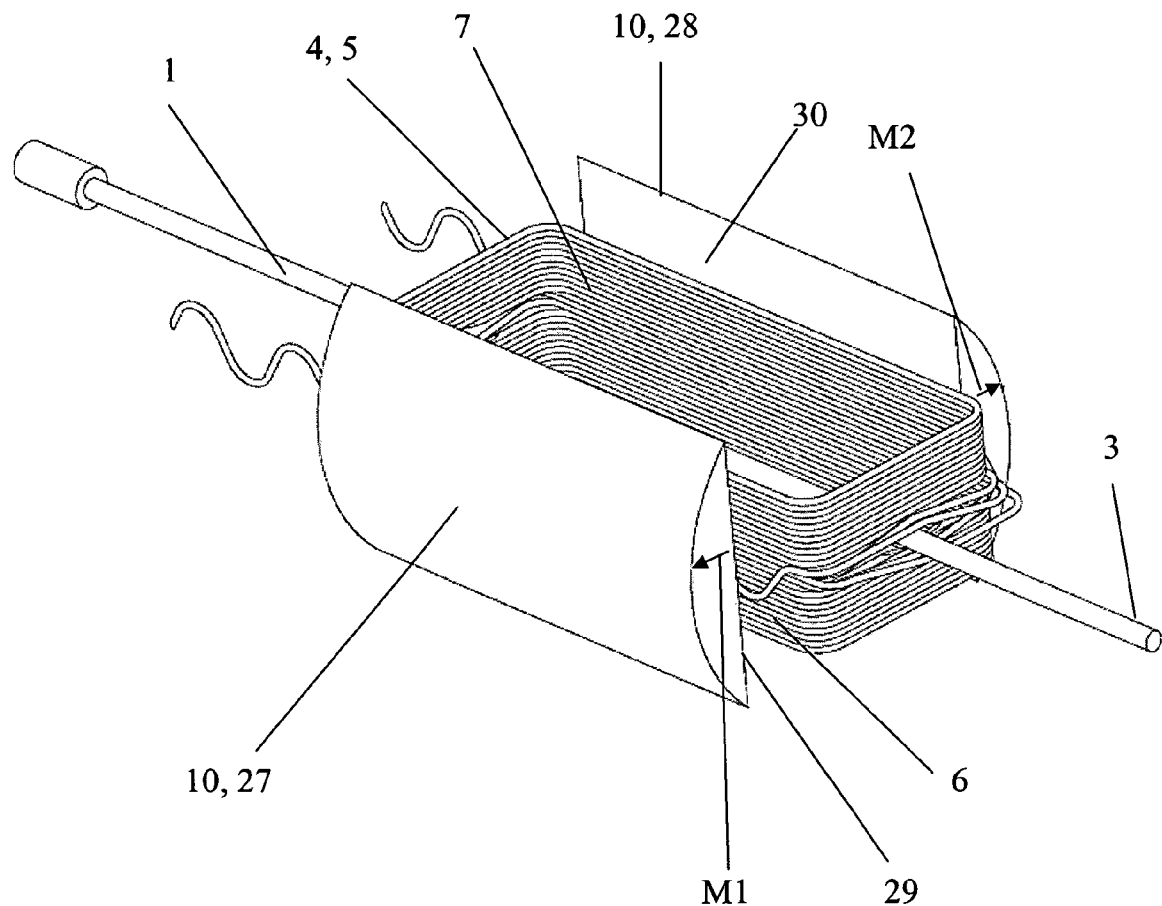
FIG. 5 shows a general view of an embodiment of the magnetic system with the permanent magnet system comprising two permanent magnet pieces with magnetization directions that are substantially orthogonal to the own axis of the optical fiber and opposite to each other.

The magnetic system shown in FIG. 5 operates analogous to the embodiment shown in FIG. 2. In this embodiment as distinguished from the embodiment of FIG. 2, the permanent magnet system 10 comprises a first permanent magnet piece 27 and a second permanent magnet piece 28 with magnetization directions M1 and M2, respectively, that are substantially orthogonal to the own axis of the optical fiber 1 and opposite to each other. The first permanent magnet piece 27 has an inner surface 29 and the second permanent magnet piece 28 has an inner surface 30. The first permanent magnet piece 27 and the second permanent magnet piece 28 extend in a direction substantially aligned with the own axis of the optical fiber 1. A current conductor 4 including at least one loop 5 is placed in the magnetic field of the permanent magnet system 10 between the first permanent magnet piece 27 and the second permanent magnet piece 28. The current conductor loop 5 includes a first part 6 and a second part 7. The first part 6 of the current conductor loop 5 is adjacent to at least a part of the inner surface 29 of the first permanent magnet piece 27. The second part 7 of the current conductor loop 5 is substantially opposite the first part 6 of the current conductor loop 5 with respect to the center of the current conductor loop 5. The second part 7 of the current conductor loop 5 is adjacent to at least a part of the inner surface 30 of the second permanent magnet piece 28. In the embodiment shown in FIG. 5 the first permanent magnet piece 27 and the second permanent magnet piece 28 have flat inner surfaces 29, 30, respectively. When control current is applied the force that affects the current conductor loop 5 has the same direction in the first part 6 and in the second part 7. This force causes respective displacement of the current conductor loop 5 which leads to a deflection of the distal part 3 of the optical fiber 1 in the direction substantially orthogonal to its own axis.

Figure 6:
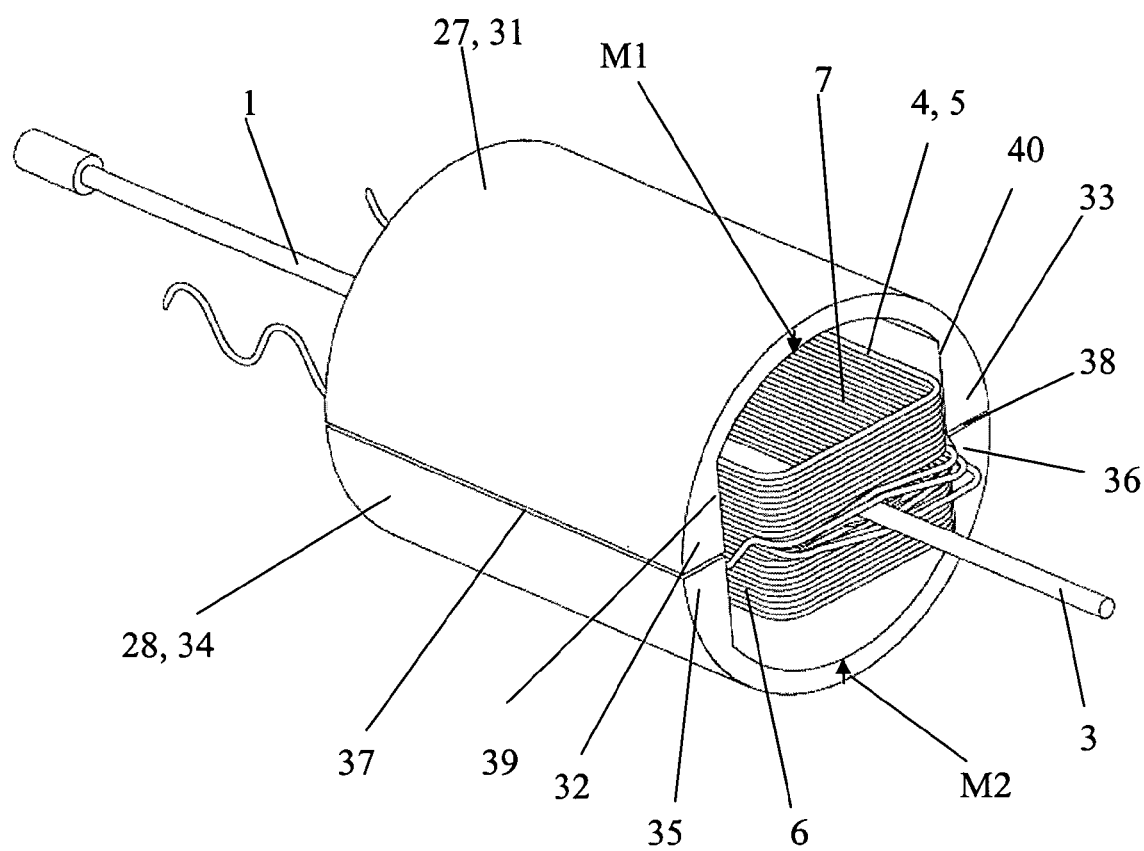
FIG. 6 shows a general view of another embodiment of the magnetic system with the permanent magnet system comprising two permanent magnet pieces of an arc type, which are joined together at their ends, with magnetization directions that are substantially orthogonal to the own axis of the optical fiber and opposite to each other.

In the embodiment shown in FIG. 6 the first permanent magnet piece 27 is made as a first permanent magnet arc 31 with the ends 32, 33 of the first permanent magnet arc 31 facing the own axis of the optical fiber 1. The second permanent magnet piece 28 is made as a second permanent magnet arc 34 with the ends 35, 36 of the second permanent magnet arc 34 facing the own axis of the optical fiber 1. The ends 32, 33 of the first permanent magnet arc 31 are joined together with respective ends of the second permanent magnet arc 34 forming thereby a first junction area 37 and a second junction area 38. The current conductor 4 includes at least one loop 5, the current conductor loop 5 including a first part 6 and a second part 7. The second part 7 of the current conductor loop 5 is substantially opposite the first part 6 with respect to the center of the current conductor loop 5. The first junction area 37 has an inner surface 39, the second junction area 38 having an inner surface 40. In the embodiment shown in FIG. 6 the inner surface 39 and the inner surface 40 are made flat. The first part 6 of the current conductor loop 5 is adjacent to at least a part of the inner surface 39 of the first junction area 37, while the second part 7 of the current conductor loop 5 is adjacent to at least a part of inner surface 40 of the second junction area 38. When control current is applied the force that affects the current conductor loop 5 has the same direction in the first part 5 and in the second part 7. This force causes respective displacement of the current conductor loop 5 together with a deflection of the distal part 3 of the optical fiber 1 in the direction substantially orthogonal to its own axis.

Figure 7:
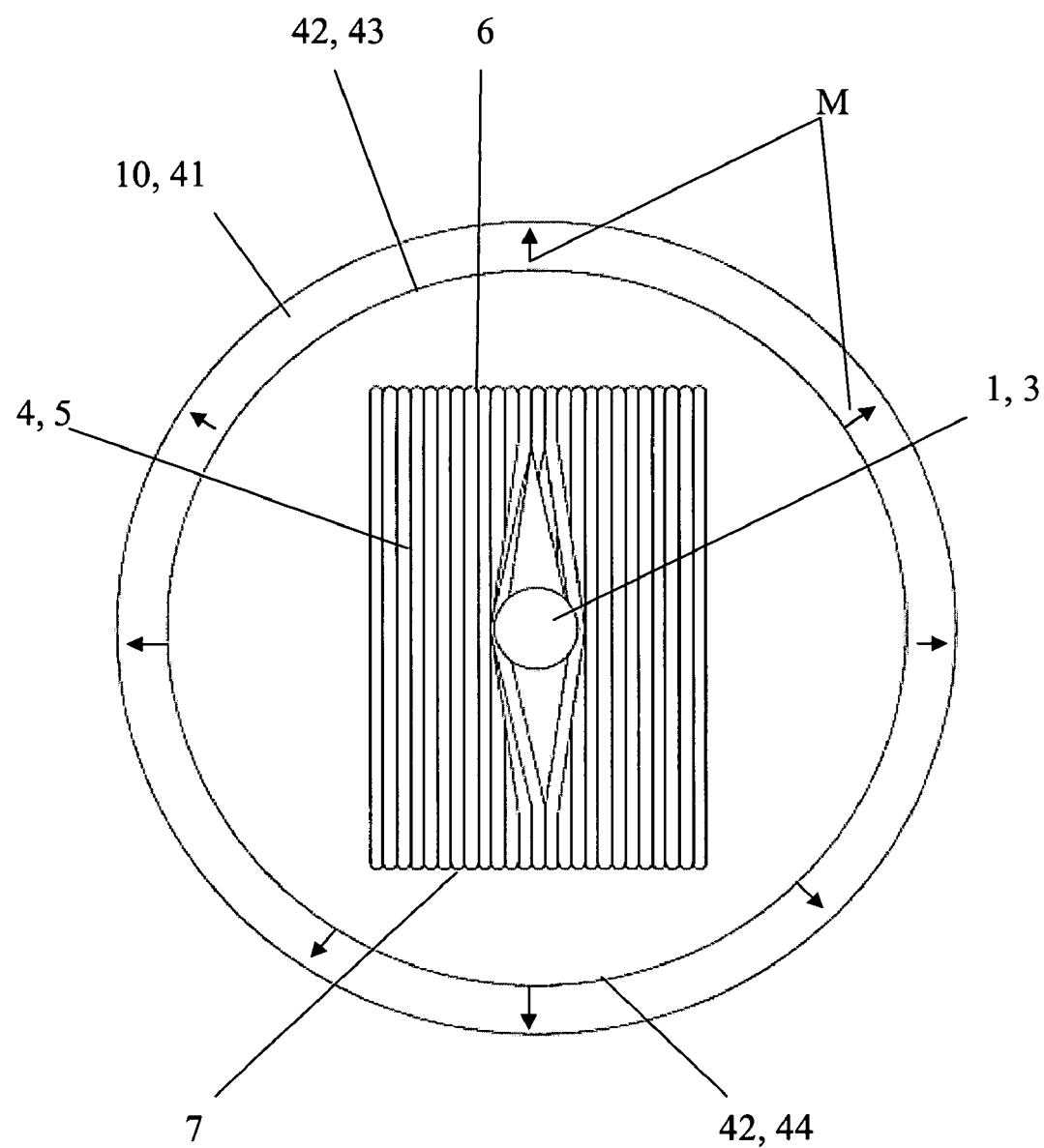
FIG. 7 shows an end view of another embodiment of the magnetic system with the permanent magnet system of a hollow cylinder type with a substantially radial magnetization direction.

In the embodiment of FIG. 7 as distinguished from above described embodiments the permanent magnet system 10 includes a permanent magnet of a hollow cylinder 41 type with a substantially radial magnetization direction M. The permanent magnet cylinder 41 has an inner surface 42 and extends in a direction substantially aligned with the own axis of the optical fiber 1. The current conductor 4 is placed in the magnetic field of the permanent magnet cylinder 41 and includes at least one current conductor loop 5. The current conductor loop 5 includes a first part 6 and a second part 7, which is substantially opposite the first part 6 of the current conductor loop 5 with respect to the center of the current conductor loop. The first part 6 of the current conductor loop 5 is adjacent to a first part 43 of the inner surface 42 of the permanent magnet cylinder 41. The second part 7 of the current conductor loop 5 is adjacent to a second part 44 of the inner surface 42 of the permanent magnet cylinder 41. When control current is applied the force that affects the current conductor loop 5 has the same direction in the first part 6 and in the second part 7. This force causes respective displacement of the current conductor loop 5 together with a deflection of the distal part 3 of the optical fiber 1 in the direction substantially orthogonal to its own axis.

Figure 8:
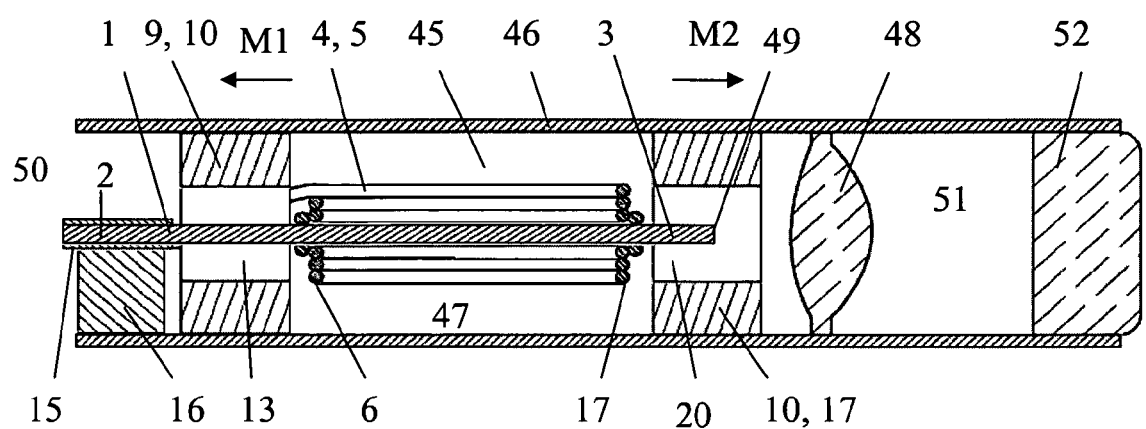
FIG. 8 is a cross-sectional view of a miniature optical fiber probe which incorporates one of the embodiments of the developed the optical fiber lateral scanner.

FIG. 8 shows a cross-sectional view of one particular embodiment of a miniature optical fiber probe, which incorporates one of the modifications of above described optical fiber lateral scanner. Referring to operation of the miniature optical fiber probe illustrated in FIG. 8, an optical radiation from a source of optical radiation, which is not shown in the drawing, passes along the optical fiber 1 from its proximal part 2 to its distal part 3. The optical fiber 1 extends through a through-hole 45 of an elongated body 46, which may be made of stainless steel. In a particular embodiment the length of the body 46 is no more than 27 mm, whereas its diameter is no more than 2.7 mm. The optical fiber probe comprises also an optical fiber lateral scanner 47 and a lens system 48. The optical fiber lateral scanner 47 is connected with a source of control current (not shown in the drawing). Said source of control current may be located inside the body 46 of the optical fiber probe and may be arranged as a photoelectric converter (not shown in the drawing). The optical fiber lateral scanner 47 includes the bearing support 16, the permanent magnet system 10, the current conductor 4 and the optical fiber 1. The lateral scanner 47 and the lens system 48 are encased into the elongated body 46, the bearing support 16, the permanent magnet system 10 and the lens system 48 being mechanically connected with the elongated body 46. The optical fiber 1 is rigidly fixed to the current conductor 4. The optical fiber 1 serves as a flexible cantilever with a capability for the distal part 3 of the optical fiber 1 of being deflected in a direction substantially orthogonal to its own axis. The proximal part of the optical fiber 1 is fixedly attached to the bearing support 16. The distal part 3 of the optical fiber 1 has an end face 49, which is optically coupled with the lens system 48. The permanent magnet system 10 of the optical fiber lateral scanner 47 has a path for the optical radiation to pass from the proximal part 50 of the miniature optical fiber probe to the distal part 51 of the miniature optical fiber probe.

The permanent magnet system 10 of the optical fiber lateral scanner 47 shown in FIG. 8 comprises the first permanent magnet 9 and the second permanent magnet 17. The magnetization direction M2 of the second permanent magnet 17 is substantially opposite to the magnetization direction M1 of the first permanent magnet 9. The current conductor 4 includes at least one loop 5, the plane of the current conductor loop 5 being substantially aligned with the own axis of the optical fiber 1. The current conductor loop 5 is placed between the first permanent magnet 9 and the second permanent magnet 17 adjacent to respective end faces of the first and second permanent magnets 9, 17. The current conductor 4 via electrodes 15, which are fixed on bearing support 16, is connected with a source of control current (not shown in the drawing) which is placed outside body the 46. The optical fiber 1 extends along through-holes 13, 20 provided in the first and second permanent magnets 9, 17, respectively. Diameters of through-holes 13, 20 should exceed the predetermined amplitude of deflection of the optical fiber 1 and allow for the optical radiation to pass from the proximal part of the optical fiber lateral scanner to the distal part of the optical fiber lateral scanner.

An output window 52 of optical fiber probe 8 is placed near to the image plane of the end face 49 of the distal part 3 of the optical fiber 1. In the embodiment shown in FIG. 8 the output window 52 is arranged as a plane-parallel plate. The output window 52 is optically transparent in the range of operating wavelengths. The lens system 48 may have any known specific configuration. The distal part 51 of the optical fiber probe, which includes the output window 52, may be made as a changeable or disposable tip. In this case it will be connected to the proximal part of the optical fiber probe with a detachable connection (not shown in the drawing).

The first permanent magnet 9 and the second permanent magnet 17 create a stationary magnetic field. The magnetic lines of force of this stationary magnetic field cross the first part 6 and the second part 7 of the current conductor loop 5 in a direction substantially orthogonal to the current direction in the current conductor loop 5. The current direction in the first part 6 of the current conductor loop 5 is opposite to that of the second part 7. Thus, when control current is applied the force that affects the current conductor loop 5 has the same direction in the first part 6 and in the second part 7. This force causes respective displacement of the current conductor loop 5 together with a deflection of the distal part 3 of the optical fiber 1 in the direction substantially orthogonal to its own axis. The lens system 48 ensures focusing of the optical radiation beam that has passed along the optical fiber 1 onto the surface of the object under study.

It should be understood that a miniature optical fiber probe can be designed using any one of the optical fiber lateral scanners described above. In any embodiment of the optical fiber lateral scanner 47 or the miniature optical fiber probe the shape of the current conductor loop 5 is not limited to the one shown in the drawings. It could, for example, have a triangular shape. In some embodiments it might be preferable to mount the current conductor loop 5 on a bobbin or to make multi-layered. The current conductor loop 5 can be manufactured using a lithographic process.

While several embodiments of the present invention have been described, it should be understood that various changes, adaptations, and modifications may be made therein without departing from the spirit of the invention. Changes may be made in details, particularly in matters of shape, size, material, and arrangement of parts without exceeding the scope of the invention. Accordingly, the scope of the invention is as defined in the language of the appended claims.

What is claimed is:

1. An optical fiber lateral scanner for a miniature optical fiber probe comprising:
    a moving part and a stationary part;
    the moving part including a movable current conductor and an optical fiber, the optical fiber being rigidly fixed to the current conductor, the optical fiber having a proximal part and a distal part and serving as a flexible cantilever with a capability for the distal part of the optical fiber of being deflected in a direction substantially orthogonal to its own axis;
    the stationary part comprising a bearing support with the proximal part of the optical fiber being fixedly attached to it, and a permanent magnet system;
    the permanent magnet system having a path for an optical radiation to pass from the proximal part of the optical fiber lateral scanner to the distal part of the optical fiber lateral scanner and including a first permanent magnet with a magnetization direction that is substantially aligned with the own axis of the optical fiber, the first permanent magnet having a proximal end face and a distal end face, and
    the current conductor being placed in the magnetic field of the permanent magnet system and including at least one current conductor loop, the plane of the current conductor loop being substantially aligned with the own axis of the optical fiber.

2. The optical fiber lateral scanner according to claim 1, wherein the current conductor loop includes a first part and a second part, the first part of the current conductor loop being adjacent to the one of the end faces of the first permanent magnet, the second part of the current conductor loop being substantially opposite the first part of the current conductor loop with respect to the center of the current conductor loop.

3. The optical fiber lateral scanner according to claim 2, wherein the first permanent magnet is provided with a through-hole, the through-hole being substantially axially aligned with the optical fiber, at least a part of the optical fiber being placed in the through-hole within the first permanent magnet.

4. The optical fiber lateral scanner according to claim 2, wherein the permanent magnet system further includes a second permanent magnet with a magnetization direction that is substantially opposite to the magnetization direction of the first permanent magnet, the second permanent magnet having a proximal end face and a distal end face, one of the end faces of the second permanent magnet being positioned adjacent to the second part of the current conductor loop.

5. The optical fiber lateral scanner according to claim 4, wherein the first permanent magnet and the second permanent magnet are provided with a through-hole, the through-hole being substantially axially aligned with the optical fiber, at least a part of the optical fiber extending along the through-hole in the first permanent magnet and along the through-hole in the second permanent magnet.

6. The optical fiber lateral scanner according to claim 1, wherein the permanent magnet system further includes a soft-magnetic conductor, which is positioned in the magnetic field of the permanent magnet system in the location area of the current conductor loop, the soft-magnetic conductor including at least one member.

7. The optical fiber lateral scanner according to claim 4, wherein the permanent magnet system further includes a soft-magnetic conductor, which is positioned in the magnetic field of the permanent magnet system in the location area of the current conductor loop, the soft-magnetic conductor including at least one member.

8. An optical fiber lateral scanner for a miniature optical fiber probe comprising:

a moving part and a stationary part;

the moving part including a movable current conductor and an optical fiber, the optical fiber being rigidly fixed to the current conductor, the optical fiber having a proximal part and a distal part and serving as a flexible cantilever with a capability for the distal part of the optical fiber of being deflected in a direction substantially orthogonal to its own axis;

the stationary part comprising a bearing support with the proximal part of the optical fiber being fixedly attached to it, and a permanent magnet system;

the permanent magnet system having a path for an optical radiation to pass from the proximal part of the optical fiber lateral scanner to the distal part of the optical fiber lateral scanner and including a permanent magnet of a hollow cylinder type with a substantially radial magnetization direction, the permanent magnet cylinder having an inner surface and extending in a direction substantially aligned with the own axis of the optical fiber, and the current conductor being placed in the magnetic field of the permanent magnet cylinder and includes at least one current conductor loop, the plane of the current conductor loop being substantially aligned with the own axis of the optical fiber, the current conductor loop including a first part and a second part, the first part of the current conductor loop being adjacent to a first part of the inner surface of the permanent magnet cylinder, the second part of the current conductor loop being substantially opposite the first part of the current conductor loop with respect to the center of the current conductor loop and being adjacent to a second part of the inner surface of the permanent magnet cylinder.

* * * * *